United States Patent [19]
Rodgers et al.

[11] 3,811,328
[45] May 21, 1974

[54] PULSE DURATION MODULATION PICKOFF

[75] Inventors: Aubrey Rodgers, Huntsville; Rayburn K. Widner, Arab, both of Ala.

[73] Assignee: The United States of America as represented by the Secretary of the Army, Washington, D.C.

[22] Filed: Jan. 3, 1973

[21] Appl. No.: 320,795

[52] U.S. Cl. .............................................. 74/5.6 B
[51] Int. Cl. ............................................. G01c 19/28
[58] Field of Search ................... 74/5.6 B; 33/363 Y

[56] References Cited
UNITED STATES PATENTS

| | | | |
|---|---|---|---|
| 3,373,616 | 3/1968 | Dugay | 74/5.6 |
| 3,362,233 | 1/1968 | Posingies | 74/5.6 |
| 3,340,740 | 9/1967 | Hall | 74/5.6 |
| 3,311,987 | 4/1967 | Blazek | 74/5.6 X |
| 3,328,595 | 6/1967 | Todd, Jr. | 74/5.6 X |

Primary Examiner—Manuel A. Antonakas
Attorney, Agent, or Firm—Edward J. Kelly; Herbert Berl; Jack W. Voight

[57] ABSTRACT

A pulse duration modulation pickoff is capable of sensing variations in the boundary layer of gas adjacent the rotor surface of a gyro. A gas collector probe senses the variation in boundary layer thickness and couples the signals to the sensor load circuit for responding to gyro changes in attitude. This pickoff method of sensing rotor displacement allows displacement signals to be obtained with no external excitation of the pickoff.

4 Claims, 6 Drawing Figures

3,811,328

PULSE DURATION MODULATION PICKOFF

BACKGROUND OF THE INVENTION

In a two-degree-of-freedom gyro such as a diplacement gyro, the rotor spin axis provides a stabilized reference in space. The gyro rotor spins around a stator which is fixed to related support structure. Pickoffs measure rotation of the stator or support structure with respect to the rotor and detect changes in the altitude of the gyro. These changes are coupled to using circuitry to allow monitoring of the gyro or system attitude and correction thereof if desired. In pickoffs that respond to gas jets a gas supply is normally directed toward the pickoff collector and is deflected by the spinning gyroscope rotor or may be cut on and off by the rotor in proportion to the stator changes of relative position. This external power source for the pickoffs result in additional error signal in torques applied to the rotor, which must be compensated for.

SUMMARY OF THE INVENTION

The pulse duration modulation (PDM) pickoff collects gyro rotor surface gas immediately adjacent the rapidly spinning rotor surface. The collector probe then excites a bi-stable fluid element in response to the gas pressure thereon. The PDM pickoff minimizes gas disturbing torques acting on the gyroscopic element, such as gas flowing directly on or reflected from the rotor, since the natural rotor boundary layer provides the required pickoff power. Thus, no external power source is required to excite the pickoff. The pickoff can be utilized with any displacement type of gyro that requirs a PDM output signal.

DESCRIPTION OF THE PREFERRED EMBODIMENT

Figure 1:
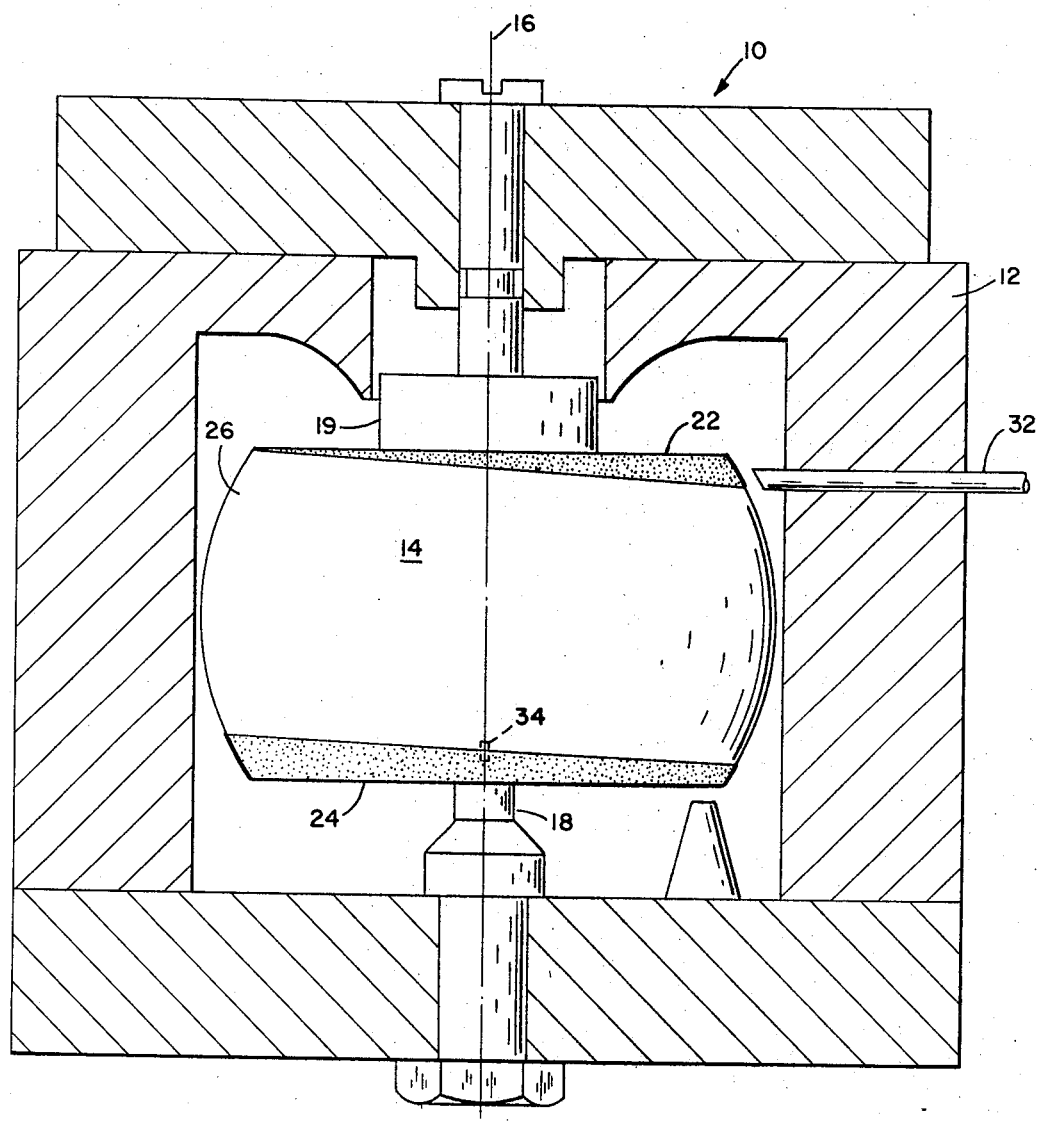
FIG. 1 discloses a typical embodiment of a gyro rotor and PDM pickoffs with extraneous stator structure omitted.

Referring now to the drawings wherein like numerals refer to like parts in the several figures, FIG. 1 discloses a typical gyro 10 with unrelated structural components being omitted. A gyro housing 12 contains a rotor 14 therein mounted for rotation around spin axis 16. The gyro stator (not shown) around which the rotor spins is supported by support members 18 and 19. Rotor 14 may be rotated on means well known in the prior art as ball or air bearings. Similarly, spinning up of the gyro prior to release may be by any of several well known methods and are therefore not disclosed herein. Rotor 14 has a raised, rough surface 22 at the upper or forward end thereof and a raised, rough surface 24 at the lower end thereof. The remainder of the rotor surface 26 is smooth. A gas collector probe 32 serves as a fluidic pickoff adjacent the rotor boundary layer of surface 22, and a gas collector probe 34 (shown in dashed lines) serves as a pickoff adjacent the boundary layer of surface 24. These pickoffs are disposed 90° apart around the periphery of the rotor and may be supported by the support housing 12.

When a gyro wheel is spinning, the gas immediately adjacent the surface of the wheel is spinning at the same velocity as the surface of the wheel. Pickoffs 32 and 34 are disposed adjacent the rotor surface within this boundary layer of gas when the rough surfaces 22 and 24 lie under respective pickoff sensors. As the rotor spins, the raised, rough surfaces periodically rotate out from under the sensors and the smooth surface 26 passes thereunder. These smooth surfaces being further removed from the sensors allow the boundary layer to be removed from the sensors, changing the velocity of gas or the gas pressure sensed by the probes. Thus, the boundary layer of gas supplies the power for the pickoffs and eliminates any need for an external power source for the pickoffs. Typically, but not limited thereto, raised surfaces 22 and 24 may be on the order of 0.001 or 0.002 inches closer to the pickoffs than smooth surface 26, with the pickoffs being disposed approximately 0.001 inches from the raised surfaces.

Figure 3:
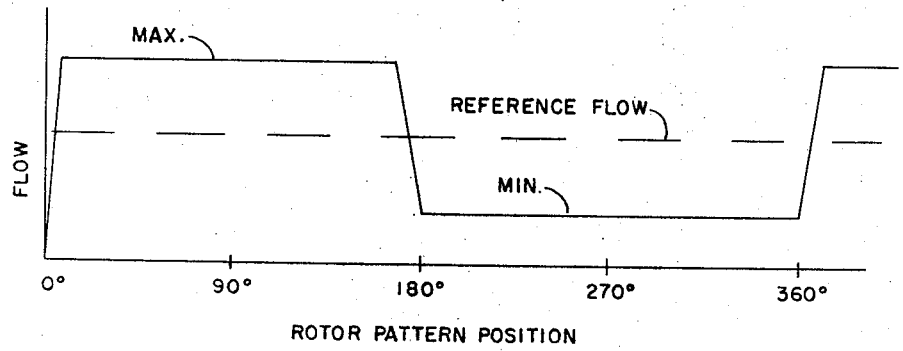
FIG. 3 is a rotor pattern-probe output signal profile for the rotor surface pattern of FIG. 2.
Figures 2A, 2B:
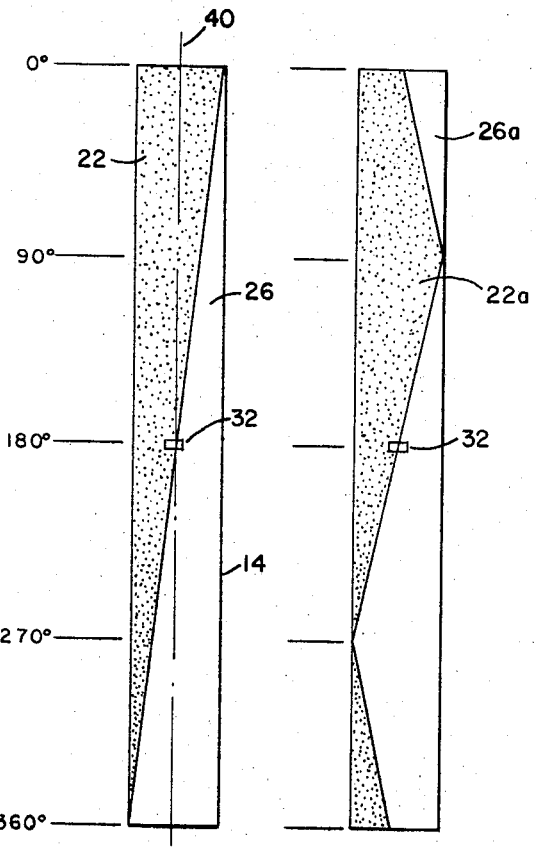
FIG. 2A is a simplified view of the rotor surface pattern adjacent the pickoff collector path for 360° of rotation.
FIG. 2B is an alternate rotor pattern to that of FIG. 2A.

As the collector probes sense the variations in boundary layer thickness of the rotor pattern a pulse duration modulation output signal is developed. Maximum flow is collected when the probes are located over the rough surfaces, minimum flow when the probes are located over the smooth surface 26. FIG. 2A is a simplified, flattened diagram of surfaces 22 and 26 for 360° of rotor rotation. Pickoff sensor 32 is shown at the 180° position of rotation, and the point of maximum width of the rough surface 22 is taken as the 0° point. FIG. 3 is a simplified curve of the PDM output for the rotor pattern-probe position during rotation of the rotor.

For illustration purposes, it is convenient to assume the probe 32 is traveling around the periphery of the rotor with the probe velocity considered equivalent to the gyro rotor angular velocity. As probe 32 travels the centerline path 40 from 0° through 360° of the rotor surface pattern, the gas collector probe collects maximum flow while the probe is over rough surface 22. This flow results in a maximum output from 0° to 180° as shown in FIG. 3. At approximately 180° the probe enters the smooth surface 26 area and the flow reduces to a minimum output from 180° to 360°. At 360° or 0° the probe re-enters the rough surface area, repeating the cycle. If the probe travels the path of centerline 40, the time duration of the maximum-minimum flow outputs are equal, providing the condition of 0° modulation. When the gyro attitude has changed from this 0° or null position the probe travels a parallel path on either side of the centerline 40. The time deviation of the maximum-minimum flow outputs are then unequal, providing a positive or negative modulation signal proportional to the magnitude of displacement of the probe path from the centerline.

FIG. 2B discloses a similar rotor pattern to teat of FIG. 2A, having the same PDM curve shown in FIG. 3. Obviously other rotor surface patterns can provide additional stepped types of output signals. Similarly, the surface patterns hereinabove described may be repeated every 180°, for exmaple.

Figure 4:
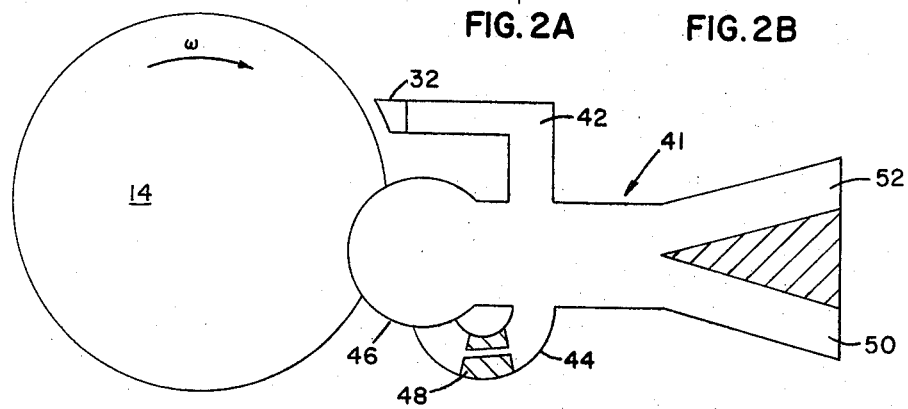
FIG. 4 is a simplified diagrammatic view of a bi-stable fluidic element responsive to the PDM pickoff signal.

FIG. 4 shows the PDM pickoff arrangement for a single collector probe. Since the collector probes 32, 34 have identical output circuits, the pickoff 34 and associated bi-stable fluidic element is not shown. Pickoff probe 34 is positioned 90° from probe 32 around the periphery of rotor 14, being disposed such that the 0° position occurs simultaneously for both probes during rotation of the rotor. The boundary layer of rotor 14 generates maximum-minimum flow signals that are captured by the gas collector probes 32 and 34. Typically, probe 32 transfers the flow signals to the control port 42 of a bi-stable fluidic amplifier 41. A control port 44 connects the amplifier to a bi-stable power supply 46 through a dropping resistance 48. The dropping resistance, a restricted fluid passage, provides control port 44 with a fluid flow rate of approximately 50 percent of the maximum-minimum difference flow sensed by collector probe 32. This 50 percent flow rate provides the switching level that determines whether output port 50 or 52 receives the output flow signal.

The PDM pickoff is operational when correct power is supplied from power source 46 and when gyro rotor 14 is energized to the desired angular velocity. FIG. 3 discloses the steady state reference flow signal from port 44 as a dashed line across the maximum-minimum output curve of the rotor pattern position. Maximum flow signal from the rotor-probe position of approximately 0° – 180° will maintain the bi-stable elemtn power stream exiting through outlet port 50. When the maximum flow drops below the reference flow from control port 44, the reference flow signal switches the power stream, exiting the stream through outlet port 52. This cycle repeats as a function of rotor angular velocity and rotor pattern-probe parallel path displacement.

Figure 5:
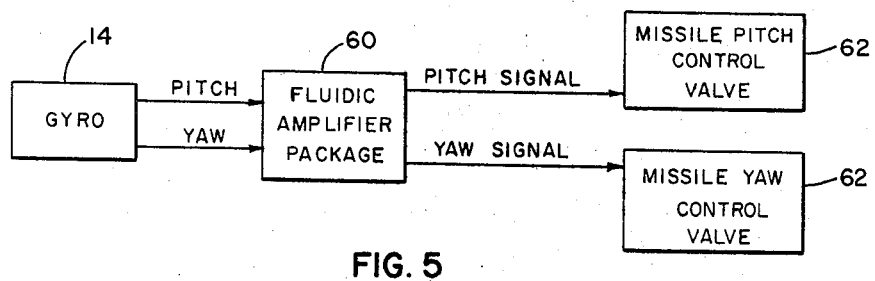
FIG. 5 is a simplified block diagram of a fluidic missile control system embodying the PDM pickoff.

FIG. 5 shows a fluid missile control system embodying the PDM gyro pickoff system for providing error control signals. Gyro 14, algned with the spin axis along the missile body axis, produces pitch and yaw PDM pressure signals proportional to the misalignment between the missile body axis and the gyro spin axis. A cold gas fluidic bi-stable package 60 amplifies the gyro output signals until they are of sufficent magnitude to drive hot gas reaction valves 62 of the missile. The hot gas valves react to the input fluidic error signals to return the missile body axis into alignment with the gyro spin axis. Bi-stable package 60 comprises separate fluidic amplifiers 41 for respective pitch and yaw signals. Obviously these respective signas may be amplified through several fluidic amplifier stages to increase the output power level if required.

Obviously many modifications and variations of the pulse duration modulation pickoff are possible in the light of the foregoing disclosure. It is therefore understood that within the scope of the appended claims the invention may be practiced otherwise than as specifically described herein.

We claim:

1. A pulse duration modulation gyro pickoff system for displacement control comprising a gyro motor having a rotor disposed for rotation about a spin axis for providing two degrees of freedom; first and second raised areas on the exterior surface of the rotor forming respective annular rings of width varying around the circumference of said rotor adjacent respective ends thereof, said raised areas of varying width being determined by a gradually increasing line slope from zero width at the edge of respective rotor ends to a predetermined width greater than zero at approximately 360° from said zero width around the rotor periphery; and first and second gas collector probe pickoffs disposed respectively adjacent said first and second raised areas for responding to boundary layer gasee moving adjacent the rotor surface, said first and second collector probes being spaced 90° apart around the periphery of the rotor in parallel planes.

2. A gyro pickoff system as set forth in claim 1 wherein respective collector probes are positioned to lie over respective raised areas during substantially 50 percent of each rotor revolution when the rotor spin axis is normal to the respective pickoff planes for providing a balanced or null pulse duration modulation signal output.

3. A gyro pickoff system as set forth in claim 2 and further comprising first and second bi-stable fluid amplifiers each having first and second outputs, first and second control ports, and a gas source; said first control ports being coupled to respective probe pickoffs for responding to gyro boundary layer currents sensed thereby, and said second control ports being resistively coupled to respective gas sources for providing a controlled bias pressure thereto and thereby controlling the amplifier switching level.

4. A gyro pickoff system as set forth in claim 1 wherein said first and second raised areas are rough for enhancing boundary layer gas currents therearound during rotor rotation.

* * * * *